T. H ASHTON.
Clod Crusher and Harrow.
No. 82,784.          Patented Oct. 6, 1868.
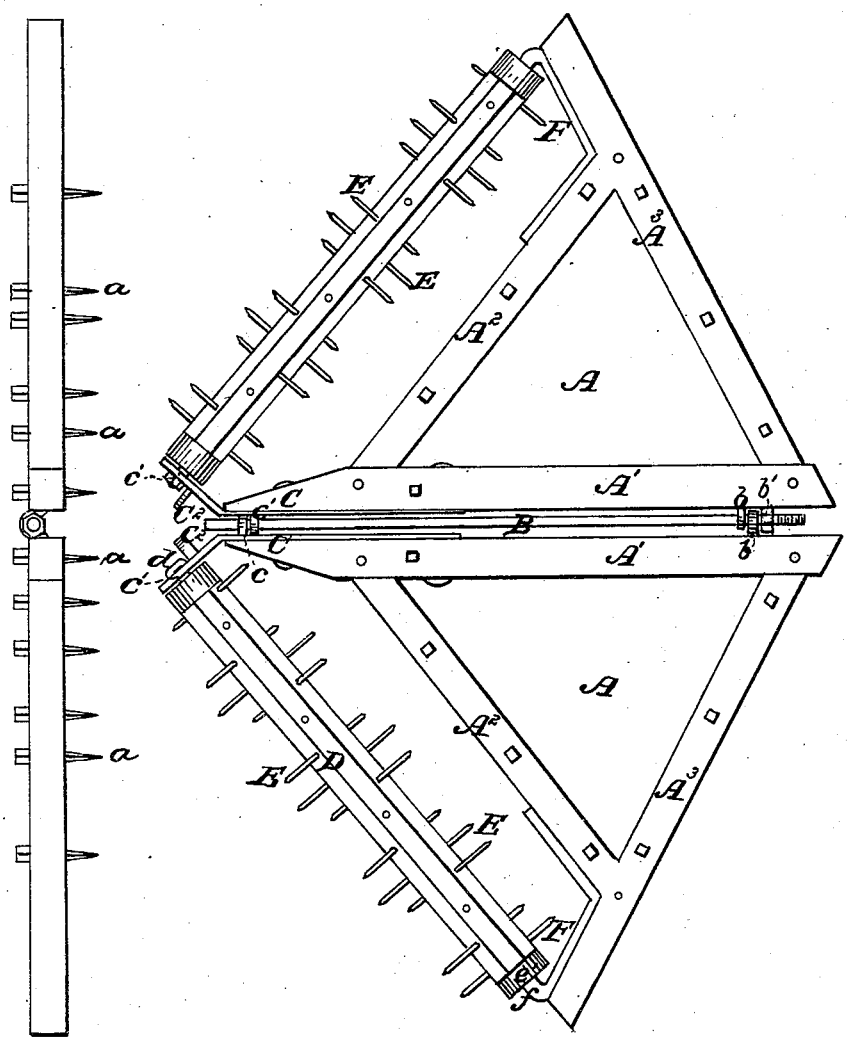

United States Patent Office.

DR. T. H. ASHTON, OF DEFIANCE, OHIO.

Letters Patent No. 82,784, dated October 6, 1868.

IMPROVEMENT IN CLOD-CRUSHERS.

The Schedule referred to in these Letters Patent and making part of the same.

TO ALL WHOM IT MAY CONCERN:

Be it known that I, DR. T. H. ASHTON, of Defiance, county of Defiance, and State of Ohio, have invented certain new and useful Improvements in Clod-Crushers and Harrows; and I do hereby declare that the following is a full, clear, and exact description of the same, reference being had to the accompanying drawings, and the letters of reference marked thereon, making part of this specification.

Figure 1 is a top plan view, showing the harrows and arrangement of rollers.

Figure 2 is an end view.

The nature of my invention consists in so combining, with a double-triangular harrow-frame, clod-cutting or crushing rollers, that the large lumps or clods of soil are completely broken before the same are subjected to the action of the harrow.

The rollers are provided with teeth similar to those of the harrow, and in their action not only crush the clods, but, by slightly compressing the soil, leave the same smooth for the passage of the harrow. By my arrangement it will be seen that the clods are not only crushed, but, by the combining of the rollers in the manner shown, the implement is adapted to any surface, no matter how great its undulations may be.

To enable others skilled in the art to make and use my invention, I will now proceed to describe its construction and operation.

A A are two triangular harrow-frames, and are constructed in the usual manner, and provided with teeth $a\ a$. These frames are united by means of a metallic connecting-rod, B, which has its bearings in eyes $b\ b$ and $c\ c$, and is firmly held in position by means of nuts $b'$.

$b\ b$ are metallic eyes, which are firmly attached to the beams $A^1\ A^1$, near their rear end.

The eyes $c\ c$ are cast with or firmly secured to the plates C C.

C C are metallic plates, and are firmly bolted to the forward end of the beams $A^1\ A^1$.

$c^1\ c^1$ are openings in the end of the plates C C, in which rests one of the bearing-pins $d$ of the roller D.

$C^2\ C^2$ are clevis-hooks or links, and are also cast with or attached to the plates C C.

D D are circular or octagonal-faced rollers, and are provided with numerous teeth, E E, as clearly shown in the drawing.

This roller works between metallic plates C and F, being secured to the opening $c^1$ in the plate C by means of the headed pin $d$, and to the plate F by means of the opening $e'$ and bearing-pin $f$. The plate F is made of metal, and is firmly bolted to the beams $A^2$ and $A^3$ of the harrow-frames A A. This plate F is cast or made in the form shown in fig. 1, and is provided with a bearing-pin or rod, $f$, which enters and works in the opening $e'$ of the roller D.

It will readily suggest itself to any skilful mechanic that numerous devices are in use whereby the rollers could be readily attached to the harrows, whereby the implement would operate with equal success; therefore I do not desire to be understood as limiting myself to the precise method shown.

Having thus fully described my invention, what I claim therein as new, and desire to secure by Letters Patent, is—

The double harrows A A and rollers D D, when the same are so combined and arranged as to operate substantially as described, as and for the purpose specified.

In testimony whereof, I have signed my name to this specification in the presence of two subscribing witnesses.

DR. T. H. ASHTON.

Witnesses:
F. W. GRAPER,
J. W. SLOUGH.